(12) United States Patent
LaVigne et al.

(10) Patent No.: US 7,242,690 B2
(45) Date of Patent: Jul. 10, 2007

(54) SYSTEM FOR PERFORMING INPUT PROCESSING ON A DATA PACKET

(75) Inventors: Bruce LaVigne, Roseville, CA (US); Lewis Stephen Kootstra, Roseville, CA (US); Mark Gooch, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 966 days.

(21) Appl. No.: 10/091,837

(22) Filed: Mar. 5, 2002

(65) Prior Publication Data

US 2003/0169757 A1   Sep. 11, 2003

(51) Int. Cl.
*H04L 12/56* (2006.01)
(52) U.S. Cl. .................................................... 370/413
(58) Field of Classification Search ........ 370/412–413, 370/415, 417, 468
See application file for complete search history.

(56) References Cited

U.S. PATENT DOCUMENTS 5,412,651 A * 5/1995 Gorshe ....................... 370/412

6,469,983 B2 * 10/2002 Narayana et al. ........... 370/231

OTHER PUBLICATIONS

Budiardjo, B.; Nazief, B.; Hartanto, D., "Integrated services to differentiated services packet forwarding: guaranteed service to expedited forwarding PHB," Local Computer Networks, 2000. LCN 2000. Proceedings. 25th Annual IEEE Conference on , pp. 324-325.*
Braden, Clark & Shenker, RFC 1633, "Integrated Services in the Internet Architecture," Jun. 1994.*

* cited by examiner

*Primary Examiner*—Doris H. To
*Assistant Examiner*—Kerri M Rose
(74) *Attorney, Agent, or Firm*—Richard P. Lange (57) ABSTRACT

A system for performing an input processing function on a data packet. The system has an input port to which a first processor is coupled, which determines an attribute of the data packet, and a memory coupled to the first processor having a number of queues. The data packet is assigned to one of the queues based upon the attribute determined, which may be an indicator of a priority characterizing said data packet. Input processing is thus performed in a fixed amount of time, deferring variable latency operations until after the input memory.

16 Claims, 6 Drawing Sheets

Ascertain Data Packet Characteristic
310 classifying type of the data packet (e.g., broadcast, multicast, unicast, etc.) 371 detecting encapsulation of the data packet, if any 372 assigning a priority corresponding to tag accompanying the data packet 373 assigning a priority corresponding to another criterion 374 decoding an Internet Protocol (IP) header 375 decoding a Transfer Control Protocol (TCP) header 376 detecting a class assigned to the data packet 377 detecting a class of service rating assigned to the data packet 378 detecting a quality of service rating assigned to the data packet 379 detecting a differentiated service field, if any 381 other data packet input memory system queue assignment information 382

SYSTEM FOR PERFORMING INPUT PROCESSING ON A DATA PACKET

BACKGROUND OF THE INVENTION

1. Field of the Invention

Embodiments of the present invention relate to the field of network computing. Specifically, embodiments of the present invention relate to a method for performing input processing a data packet.

2. Related Art

Modern network computing allows great benefits by sharing information and computing resources. Information is transmitted within networks between computers in packets, wherein the data is packaged with destination and origin information promulgated by a packet header to effectuate proper routing. Routing is effectuated by routers and switches operating in the network environment, which use the header information to route the packet to the intended destination. Packets have different priorities, as for processing precedence, preference, or primacy.

Packet priorities differ because some packets are more important than others. High priority packets may be time critical, as for example packets transmitting real time voice or other data. Other high priority packets may have their high priorities because they originate from sources that have paid a premium or subscribed to a data transfer medium offering a higher priority and/or transfer rate. Other packets may have lower priorities. Some packets, such as those transferring normal email, are not especially time sensitive and thus do not need elevated priorities.

Upon receipt at a destination device, packets are buffered within designated regions of a memory, such as an input memory, while awaiting transfer between ports and input/output (I/O) devices. Such buffer storage temporarily holds packets until a program is ready to deal with their data, or for transfer to another unsynchronized device, or one having a different data transfer rate. Memories effectuating such buffer storage are structured to have a number of queues, each queue for storing packets of different processing or other priority.

Conventional packet queuing assigns a packet to a queue in an input memory, thereby prioritizing the packet therein, on the basis of limited information. Often, the only information conventionally designating a packet for queuing is a virtual local area network (VLAN) class of service (COS) value, usually constituted by three bits. The COS value simply declares a packet to be of a particular priority on the basis of a designation assigned at its source. However, virtually no other decoding of the packet takes place prior to processing, which conventionally occurs downstream of the input memory.

Figure 1:
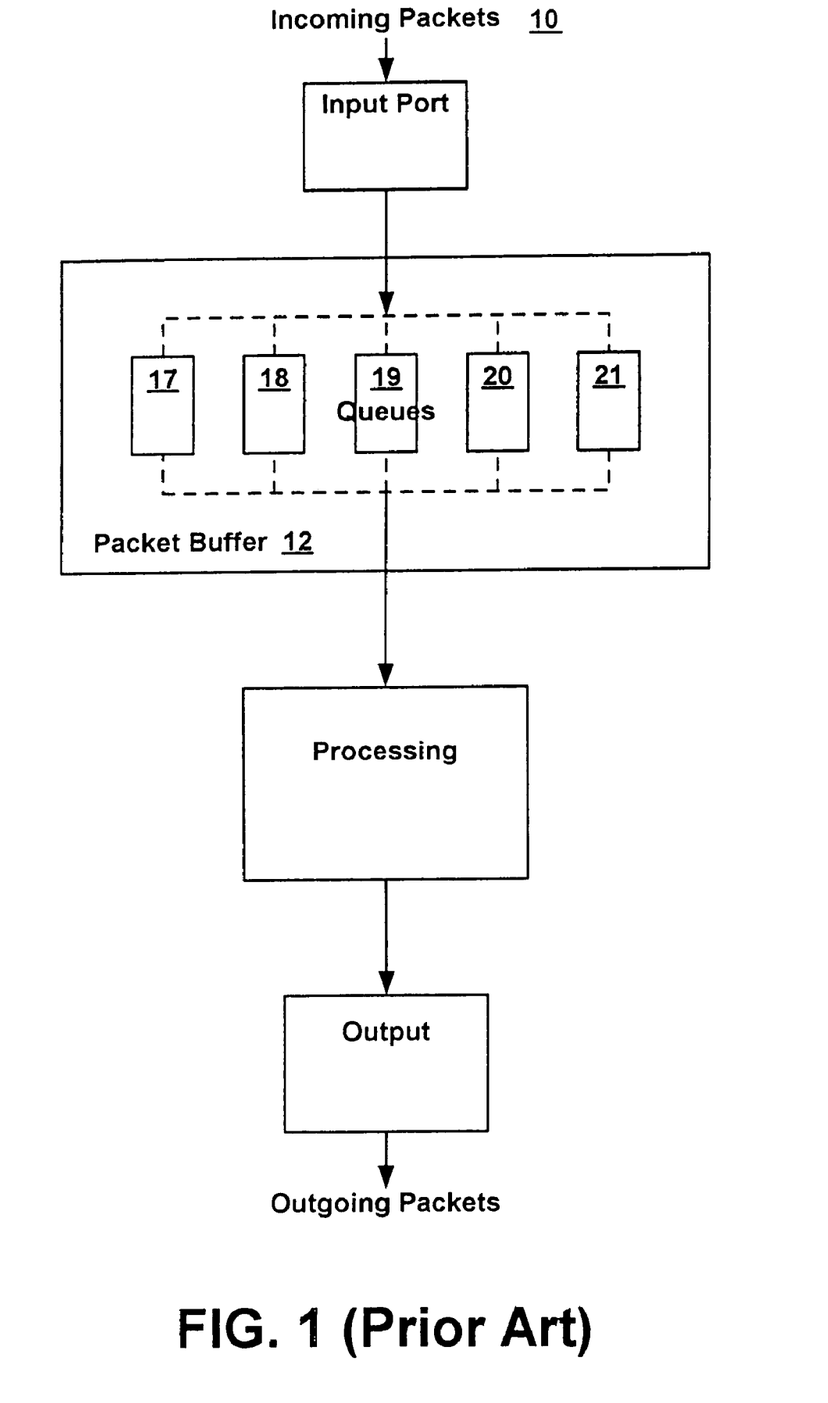
FIG. 1 is a block diagram of a conventional input queuing stage for data packets.

With reference to Prior Art FIG. 1, a typical conventional input stage is described. An input packet 10 is placed into one of five queues 17 through 21 within an input memory serving as a packet buffer 12 based on its priority. Highest priority packets are placed in queue 17. The next highest priority packets are placed in queue 18, and so forth until the lowest priority packets are placed in queue 21. These packet priorities are defined by the packets' COS values. In certain instances, this may result in a sub-optimal choice of input memory queue. Sub-optimal input memory queue assignment may result in initially misqueuing a packet, which can delay further processing.

Certain switches are strictly output buffered. These rely on fixed rate forwarding lookups. Delay in determining the correct queuing for the packet requires restriction in forward latency. Such restricted forward latency may result in dropping incoming packets. If forward latency is restricted with resulting delays in system performance, data may be further delayed or lost. Hence, queuing choices restricting forward latency or otherwise increasing the time required for processing may also cause further delays or loss of data due to resulting packet drops.

Prior art solutions have been somewhat problematic therefore, because they may result in misqueuing data packets, thus reducing buffering efficiency, delaying processing, and possibly dropping packets, which can add further delays.

SUMMARY OF THE INVENTION

An embodiment of the present invention effectuates a system for performing an input processing function on a data packet. The system is constituted by an input port to which a first processor is coupled. The first processor determines an attribute of the data packet. A memory is coupled to the first processor. The memory contains a number of queues. The data packet is assigned to one of the queues based upon the attribute determined by the first processor, which may be an indicator of a priority characterizing said data packet. Input processing is thus performed in a fixed amount of time, deferring variable latency operations until after the input memory.

BRIEF DESCRIPTION OF THE DRAWINGS

Prior Art

DETAILED DESCRIPTION OF THE INVENTION

An embodiment of the present invention effectuates a system for performing an input processing function on a data packet. The system is constituted by an input port to which a first processor is coupled. The first processor determines an attribute of the data packet. A memory is coupled to the first processor. The memory has a number of queues. The data packet is assigned to one of the queues based upon the attribute determined by the processor. This attribute may be an indicator of a priority characterizing the data packet. This has the advantage of performing the input processing operation in a fixed amount of time. Furthermore, it has the advantage of optimizing the queue to which the data packet is assigned and deterring misqueuing. In addition, it advantageously defers variable latency operations until after the input memory system, thus allowing it to optimally effectuate input packet buffering.

Certain portions of the detailed descriptions of embodiments of the invention, which follow, are presented in terms of processes, e.g., methods. Although specific steps are disclosed in such figures herein describing the operations of these processes and methods, such steps are exemplary. That is, embodiments of the present invention are well suited to performing various other steps or variations of the steps recited in the flowcharts of the figures herein.

Figure 2:
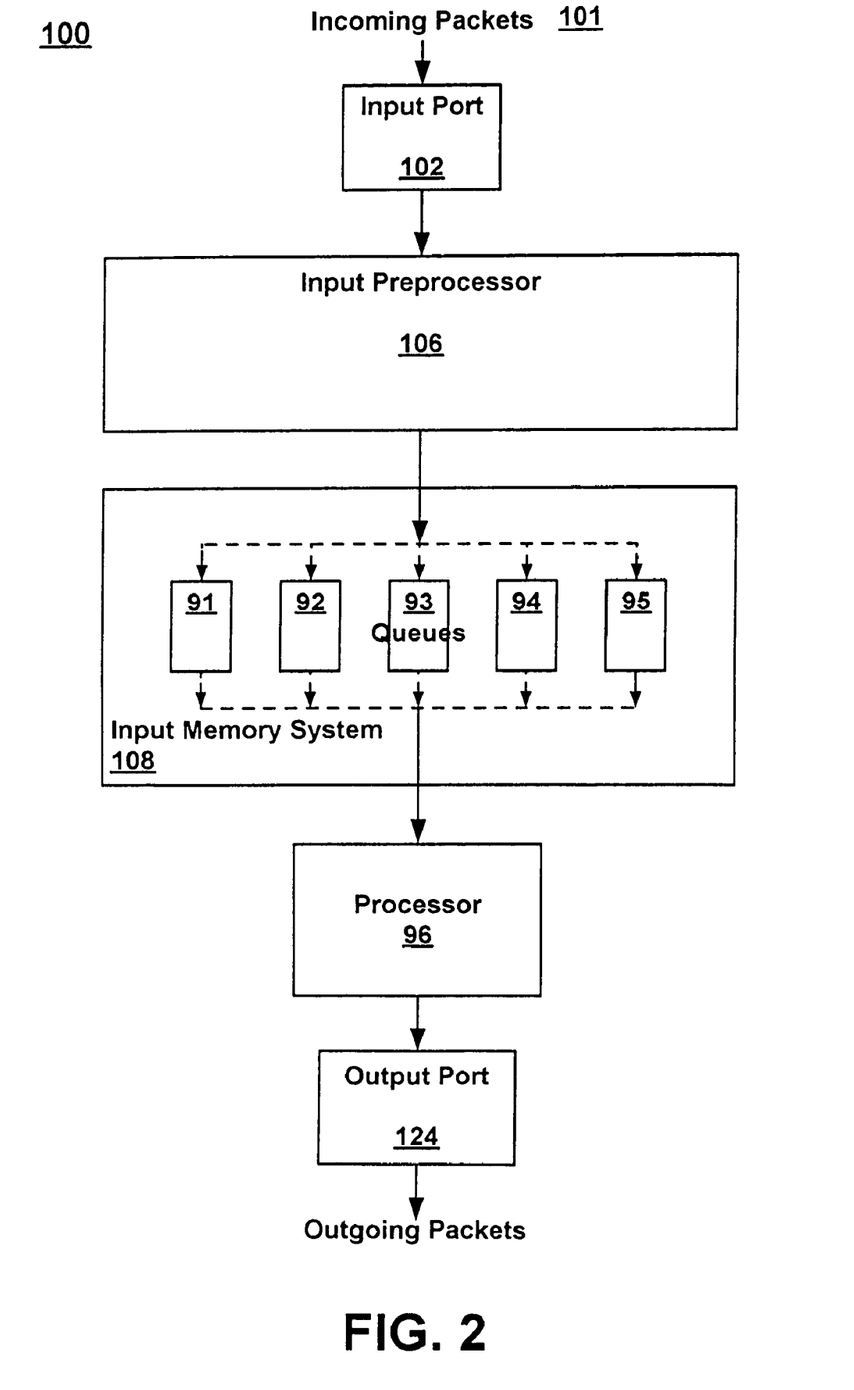
FIG. 2 is a block diagram of a system for performing an input processing operation on a data packet, in accordance with an embodiment of the present invention.

Embodiments of the present invention are discussed primarily in the context of a system for performing input processing a data packet. With reference to FIG. 2, an input packet processing system 100 preprocesses packets from an input port 102 to optimize its queuing within an input memory system. The packet is received by an input preprocessor 106. Input preprocessor 106 performs certain processing operations upon the packet to ascertain its priority. The operations performed by preprocessor 106 are accomplished in a fixed amount of time, without adding any input latency. Using information gleaned by the operations performed by preprocessor 106, the packet is assigned to a queue within input memory system 108.

Input memory system 108 has five queues 91 through 95. An incoming packet is placed into one of the five queues 91 through 95 based on its priority. If the packet is of the highest priority, it is placed in queue 91. If the packet is of the next highest priority, it is placed in queue 92, and so forth. If the packet is of the lowest priority, it is placed in queue 95. Advantageously, this effectuates optimizing the functionality of memory system 108 as an input buffer, which in turn maximizes the efficiency of downstream processing, e.g., in processor 96, such that no variable latency is added by the input stage. The number of queues herein is selected for purpose of brevity and clarity only and not to limit the number of queues that an input memory system may deploy in various embodiments. It is appreciated therefore that any multiple number of queues may characterize the queuing constitution of memory system 108.

Figure 3A:
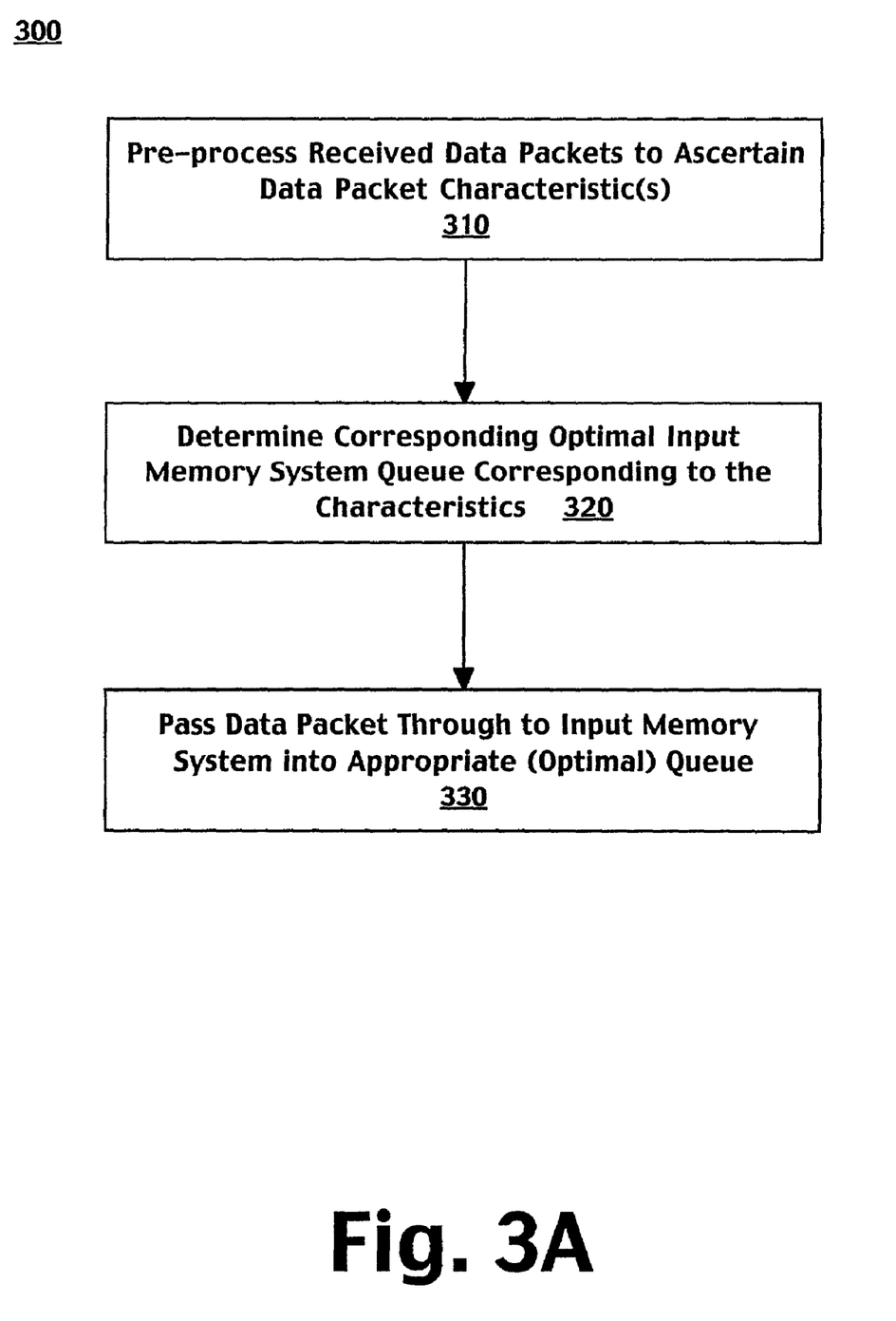
FIG. 3A is a flowchart of the steps in a process for performing an input processing operation on a data packet, in accordance with an embodiment of the present invention.

With reference to FIG. 3A, a process 300 for processing a data packet in accordance with one embodiment of the present invention is described. Process 300 begins with step 310, wherein a characteristic of the data packet is ascertained. The forwarding process selected is one which may be performed in-line by an input preprocessor; prior to queuing the data packet in an input memory system. The forwarding process ascertains as much information characterizing the data packet as possible, without causing the input preprocessor to cease to function effectively as an input pipeline.

When the characteristic of the data packet is ascertained, it is by determining corresponding information about it that can be of considerable value in subsequent processing, yet without adding any variability to the latency of the packet at this particular stage. Thus, step 310 may constitute various processing operations with the goal of gathering this information. Such information may include, but is not limited to, the information as listed in Table 1, below.

TABLE 1 classifying type of the data packet (e.g., broadcast, multicast, unicast, etc.)
detecting encapsulation of the data packet, if any
assigning a priority corresponding to tag accompanying the data packet
assigning a priority corresponding to another criterion
decoding an Internet Protocol (IP) header
decoding a Transfer Control Protocol (TCP) header
detecting a class assigned to the data packet
detecting a class of service rating assigned to the data packet
detecting a quality of service rating assigned to the data packet
detecting a differentiated services field, if any
other data packet input memory system queue assignment information These operations gather corresponding information about the packet. It is appreciated that other processing operations not listed may also be performed to ascertain other information. Whatever operations are conducted however are all conducted without varying the overall preprocessing time. Thus, no variable latency is introduced.

Using any or all of the information obtained by preprocessing to ascertain the data packet characteristic, the data packet is then prepared for assignment to an input memory system. In step 320, the corresponding input memory system queue appropriate for the data packet is determined. Optimizing this queuing decision during input preprocessing helps to maintain invariant latency in the input stage and effectively sets the input memory system up as a buffer for variable latency operations to be conducted in later processing stages. In step 330, the data packet is then passed through to the input memory system, where it is queued as optimally determined beforehand through input preprocessing. Placing the data packet in the appropriate input memory queue ends process 300.

Figure 3B:
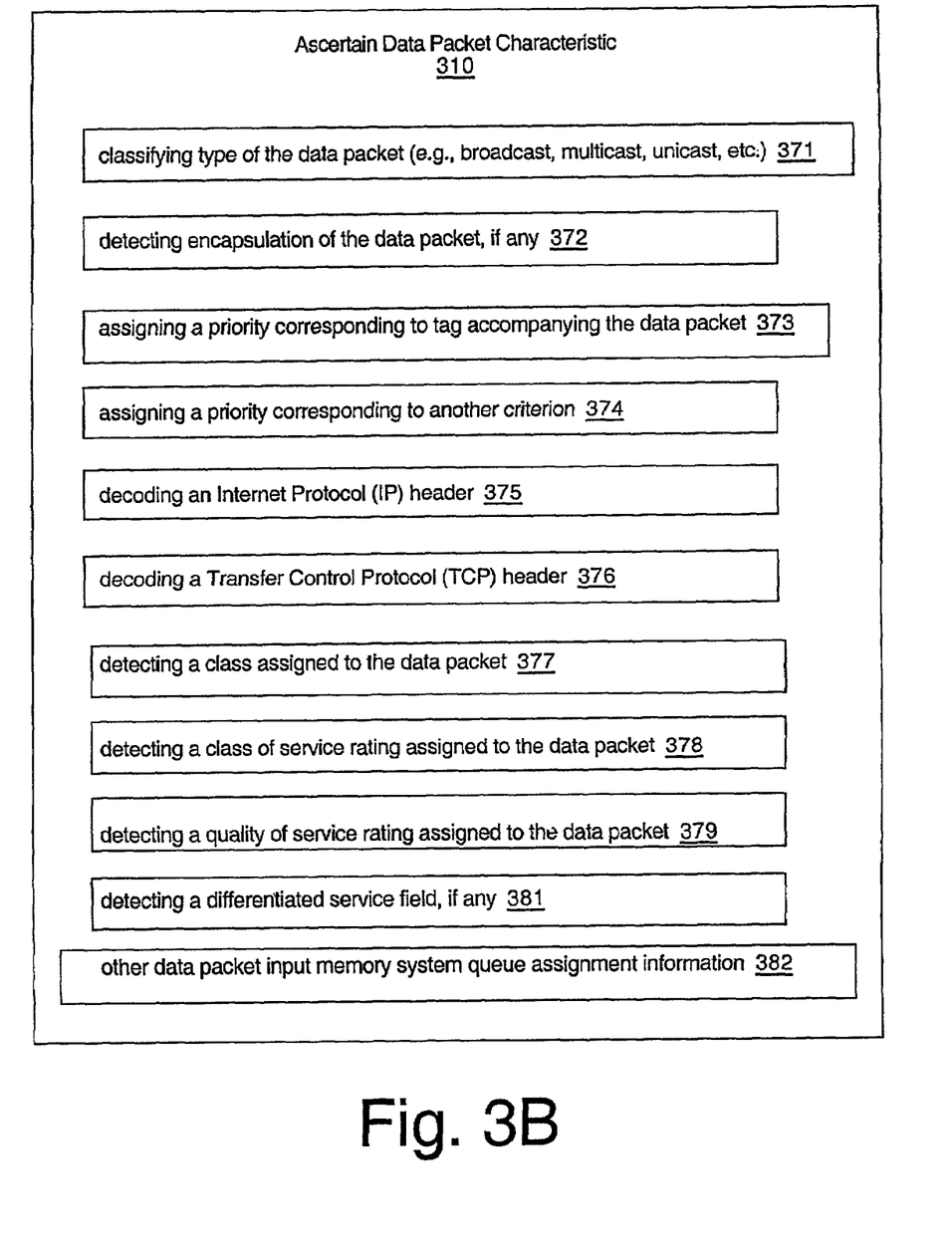
FIG. 3B is a diagram showing various preprocessing operations, in accordance with an embodiment of the present invention.

Referring to FIG. 3B, step 310 of process 300 in one embodiment includes a number of optional process steps 371-379, 381 and 382, which may be executed in any combination, from one step to all of the steps. It is appreciated that other steps may also constitute a part of step 310, and that steps 371-379, 380, and 381 and any others may be executed in any order, simultaneously, or through various combinations of such steps. In step 371, the data packet type (e.g., broadcast, multicast, unicast, etc.) is classified. In step 372, any encapsulation of the data packet is detected. In step 373, a priority corresponding to tag accompanying the data packet is assigned. In step 374, a priority corresponding to another criterion is assigned. In step 375, an IP header is decoded. In step 376, a TCP header is decoded. In step 377, a class assigned to the data packet is detected. In step 378, a class of service rating assigned to the data packet is detected. In step 379, a quality of service rating assigned to the data packet is detected. In step 381, any differentiated services fields are detected. In step 382, any other data packet input memory system queue assignment information is read.

Figure 4:
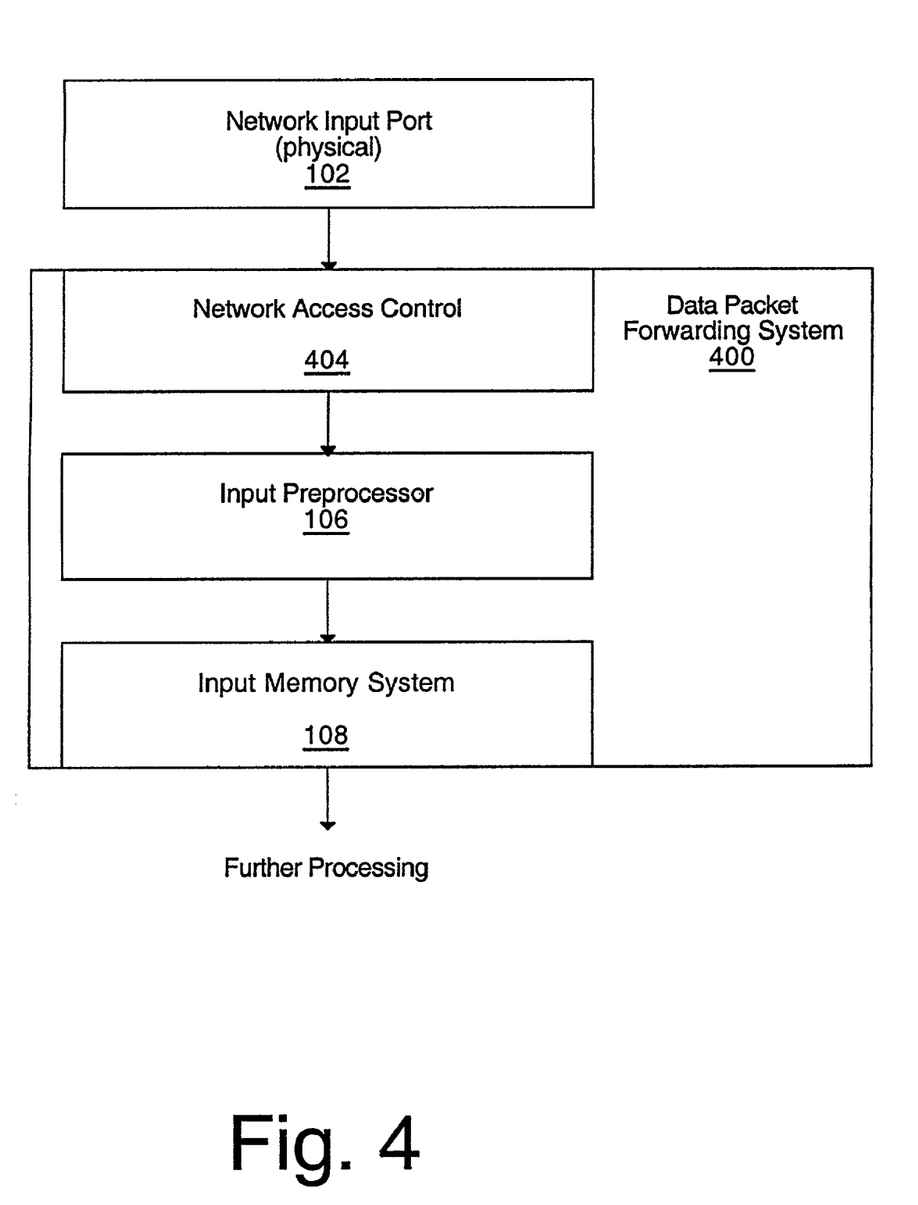
FIG. 4 is a block diagram of a processing functionality, in accordance with an embodiment of the present invention.

Referring to FIG. 4, a data packet forwarding system 400 is discussed in accordance with one embodiment of the present invention. A physical network input port 102 functions to receive data packets from a network and pass them on to the data packet forwarding system 400. Input port 102 is controlled by network access control 404, which may constitute an input MAC layer.

Input preprocessor 106 receives data packets from input port 102 and performs a processing operation upon them to optimize their queuing in input memory system 108. Input preprocessor 106 performs a forwarding process operation on a data packet, ascertaining information relevant to later processing of the data packet. Such information may be constituted much as the information delineated in Table 1, above. As the forwarding process is conducted, preprocessor 106 passes the pre-processed data packet through to input memory system 108, optimizing the queuing of the data packet therein, with no variable latency. Hence, in the present embodiment, preprocessor 106 effectively preprocesses the data packets while simultaneously pipelining the data packets from input port 102 into the optimal memory 108 queues. Thus, preprocessor 106 advantageously passes the data packets through without backing up forwarding system 400.

Figure 5:
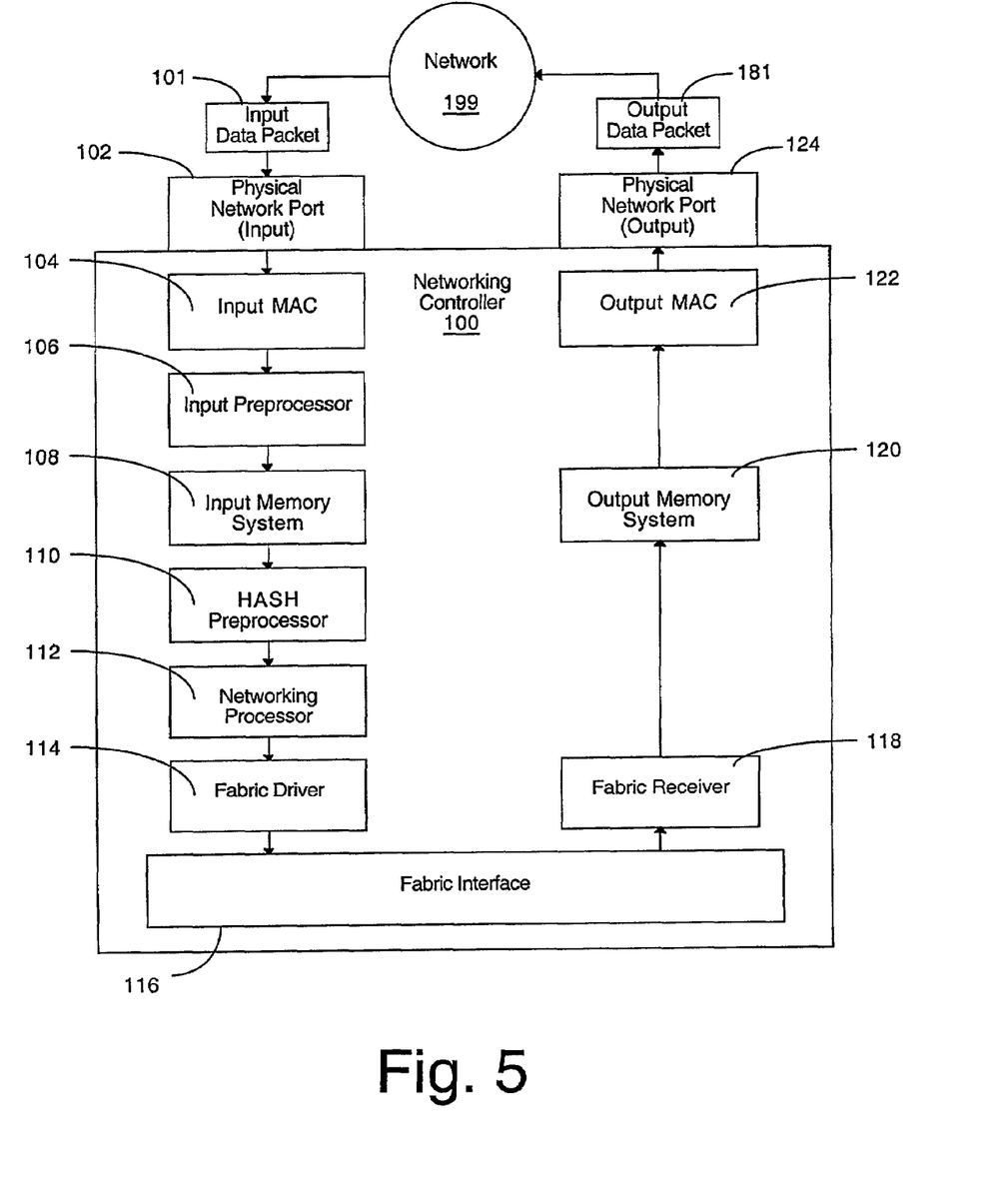
FIG. 5 is a data flow diagram of a networking controller in which an embodiment of the present invention is deployed.

Referring now to FIG. 5, an embodiment of the present invention is discussed in the context of its function within a networking controller 100. A data packet 101 is received at a physical network input port 102 from a network 199. The access of networking controller 100 to network 199 is controlled by a controlling means such as an input media access control (MAC) layer 104. Data packet 101 moves sequentially through input MAC 104, to input preprocessor 106 and input memory system 108 with no variable latency, as follows. Input preprocessor (IPP) 106 performs a processing operation upon data packet 101.

This processing operation constitutes a forwarding process which ascertains as much information characterizing data packet 101 as possible, without ceasing to function effectively as an input pipeline. IPP 106 determines information about data packet 101 that can be of considerable value in later operations conducted elsewhere in networking controller 100, yet without adding any variability to the latency of packet 101 at this particular stage. In so doing, IPP 106 performs its forwarding process such that input MAC is not backed up. Data packet 101 clears input memory system 108, where it had been optimally queued by the information gleaned by preprocessing in IPP 106.

Variable latency processing may then be performed on data packet 101. Hash preprocessor (HPP) 110 begins this variable latency processing by taking the information gleaned by preprocessing in IPP 106 and hashing the information into a lookup table (LUT). This is a variable latency process, because of the non-fixed period of time required to access the LUT, look up the information needed therefrom, and return with a result. This result is more forwarding information, specifically determining another port as a proper destination for data packet 101.

HPP 110 then forwards data packet 101 to a network processor 112. Network processor (NP) 112 functions as a memory processor, e.g., as a dedicated central processing unit (CPU) running special networking related instructions. NP 112 examines data packet 101 and, based on the packet contents, and/or on programmable rules governing its operation, performs various operations upon data packet 101. Such operations may include changing forwarding results and/or changing contents of data packet 101.

Fabric driver (FD) 114 receives data packet 101 next from NP 112. The FD 114 promulgates requests and replies to farside entities and to reserve space on an output memory system 120. FD 114 also modifies data packet 101 as necessary to accord with strictures required by its downstream destinations. FD 114 then routes data packet 101 onto fabric interface 116.

Fabric interface (FI) 116 constitutes an internal switching interconnection architecture for networking controller 100. FI 116 routes data packet 101 from the input chain, e.g., from the physical network input port 102 through (input MAC 104, IPP 106, input memory system 108, HPP 110, NP 112 to) FD 114, onto an output chain terminating in a physical network output port 124 (e.g., through fabric receiver 118, output memory system 120, and output MAC 122).

Fabric receiver (FR) 118 receives requests from fabric driver 114. These requests may be buffered. Receiving the requests, FR 118 determines which of any number of output ports, if any, on a particular integrated circuit (IC) needs to receive the particular data packet 101 for export. Further, FR 118 determines availability of memory space on the output buffer (e.g., output memory system 120), and generates a corresponding reply.

With data packet 101, FR 118 promulgates a corresponding reservation number, if it generates a positive reply to a request from FD 116. Later, upon receipt of a 'packet send' command, FR 118 looks up the reservation number it promulgated, matches it with the output port it has already determined is appropriate for data packet 101, and puts the packet on the corresponding pathway to the physical network output port 124, via the output memory system 120 and output MAC 122. Output port 124 places the outputted packet 181 back into network 199.

This architecture has the advantage of optimizing queuing on the input memory system 108 by doing as much processing in-line, upstream of input memory system 108 in IPP 106, with an invariant latency. This leverages the input memory system as a buffer, according an opportunity to perform variable latency processing on data packet 101, downstream of the input memory system, yet preserving an overall relatively low average latency sufficient to support the bandwidth required by the physical network input port 102. This prevents packets from being dropped from physical network input port 102 by backing up input MAC 104.

An embodiment of the present invention, a system and method for processing a data packet, is thus described. While the present invention has been described in particular embodiments, the present invention should not be construed as limited by such embodiments, but rather construed according to the following claims and their equivalents.

What is claimed is:

1. A system for performing an input processing function on a data packet comprising:
   an input port;
   a first processor coupled to said input port wherein said first processor performs said input processing function on said data packet to determine an attribute of said data packet; and
   a memory coupled to an output of said first processor and having a plurality of queues, each said queue having a unique priority association, wherein said data packet is assigned to one of said plurality of queues and stored in said memory based upon said attribute, wherein said input processing is performed in a fixed amount of time and variable latency processing operations are performed after said data packet is forwarded from said memory based on said priority association to a second processor, and wherein said attribute comprises at least one of:
   a type characterizing said data packet;
   encapsulation of said data packet;
   an Internet Protocol header identity;
   a Transfer Control Protocol header identity; and
   a differentiated services field.

2. The system as recited in claim 1 wherein said system functions in concert with said second processor.

3. The system as recited in claim 1 wherein said data packet is received at said input port under a networking control protocol.

4. The system as recited in claim 3 wherein said networking control protocol comprises a media access control layer.

5. The system as recited in claim 1 wherein said memory functions as an input buffer.

6. A method for performing an input process on a data packet comprising:

pre-processing said data packet to determine a characteristic of said data packet before said data packet is subjected to input buffering, wherein said pre-processing comprises a fixed time processing operation, and wherein said characteristic comprises at least one of:

classifying a type characterizing said data packet;
detecting encapsulation of said data packet;
decoding an Internet Protocol header;
decoding a Transfer Control Protocol header;
detecting a class assigned to said data packet; and
detecting a differentiated services field;
determining one of a plurality of queues within a memory in which to store said data packet according to said characteristic, wherein each said queue has a unique priority association and wherein said pre-processing is performed in a first processor coupled to an input of said memory; and
storing said data packet in said queue based on said determining wherein said storing comprises an input buffering function that is performed prior to forwarding said data packet, based on said priority association, for subsequent processing in a second processor.

7. The method as recited in claim 6 wherein said first processor comprises an input pre-processor.

8. The method as recited in claim 7 wherein said first processor passes said data packet through to said queue further comprises pipelining said data packet substantially free of variable latency.

9. The method as recited in claim 8 wherein said forwarding comprises an operation wherein said data packet is transferred from said queue within said memory to said second processor.

10. The method as recited in claim 6 wherein said forwarding enables said memory to utilize a full bandwidth of an input port coupled to said first processor.

11. The method as recited in claim 6 wherein said memory effectively buffers subsequent processing of said data packet.

12. A system for performing input processing on a data packet comprising:

means for determining an attribute of said data packet; and means for storing said data packet wherein said storing means comprises a plurality of queues, wherein each of said queues has a unique associated priority, wherein said data packet is stored in one of said queues according to said attribute, and wherein said input processing is performed in a fixed amount of time, wherein variable latency processing operations are performed after said data packet is forwarded from said memory, based on said associated priority, to subsequent processing means, and wherein said attribute comprises at least one of:

a type characterizing said data packet;

encapsulation of said data packet;

an Internet Protocol header identity;

a Transfer Control Protocol header identity; and a differentiated services field.

13. The system as recited in claim 12 wherein said determining means comprise:

means for processing said data packet; and means for pipelining said data packet into said queue.

14. The system as recited in claim 12 wherein said system functions substantially free of variable latency.

15. The system as recited in claim 12 wherein said storing means comprises means for buffering said data packet.

16. The system as recited in claim 15 wherein said buffering means functions to buffer a subsequent processing operation wherein said subsequent processing operation comprises at least one of a fixed and a variable latency.

* * * * *